US 6,621,564 B2

(12) United States Patent
Akiyama et al.

(10) Patent No.: US 6,621,564 B2
(45) Date of Patent: Sep. 16, 2003

(54) AUTOMATIC LENS METER

(75) Inventors: Hisanori Akiyama, Shinjyuku-ku (JP);
Masahiro Jinbo, Shinjyuku-ku (JP);
Toshiro Yoda, Shinjyuku-ku (JP)

(73) Assignee: Hoya Corporation, Tokyo (JP)

( * ) Notice: Subject to any disclaimer, the term of this patent is extended or adjusted under 35 U.S.C. 154(b) by 15 days.

(21) Appl. No.: 10/066,625

(22) Filed: Feb. 6, 2002

(65) Prior Publication Data

US 2002/0140928 A1 Oct. 3, 2002

(30) Foreign Application Priority Data

Feb. 9, 2001 (JP) ..................................... 2001-033936

(51) Int. Cl.[7] ................................................ G01B 9/00
(52) U.S. Cl. ...................................... 356/124; 356/127
(58) Field of Search .................................. 356/124, 125, 356/126, 127

(56) References Cited

U.S. PATENT DOCUMENTS

| 4,247,200 A | * | 1/1981 | Nohda et al. ............... 356/124 |
| 5,173,739 A | * | 12/1992 | Kurachi et al. ............. 356/124 |
| 5,379,111 A | * | 1/1995 | Kajino et al. ............... 356/124 |
| 5,489,978 A | * | 2/1996 | Okumura et al. ........... 356/124 |
| 5,521,700 A | * | 5/1996 | Kajino et al. ............... 356/124 |
| 5,719,668 A | * | 2/1998 | Oana et al. .................. 356/124 |
| 5,742,381 A | * | 4/1998 | Ueno .......................... 356/124 |
| 5,844,671 A | * | 12/1998 | Kajino et al. ............... 356/124 |
| 5,867,259 A | * | 2/1999 | Yanagi et al. ............... 356/124 |
| 5,872,625 A | * | 2/1999 | Kajino et al. ............... 356/124 |
| 5,886,779 A | * | 3/1999 | Kajino et al. ............... 356/124 |
| 5,896,194 A | * | 4/1999 | Yanagi et al. ............... 356/124 |
| 5,910,836 A | * | 6/1999 | Ikezawa et al. ............. 356/124 |

FOREIGN PATENT DOCUMENTS

| JP | A-49-122355 | 11/1974 |
| JP | 60-017335 | 1/1985 |
| JP | 60-056237 | 4/1985 |
| JP | 02-216428 | 8/1990 |
| JP | 08-020334 | 3/1996 |

* cited by examiner

Primary Examiner—Hoa Pham
(74) Attorney, Agent, or Firm—Griffin & Szipl, P.C.

(57) ABSTRACT

The invention provides an automatic lens meter comprising an optical system forming a pattern image by projecting a pattern created by a pattern creating member and measuring optical properties of a lens based on the displacement of the pattern image from a baseline position wherein the examined lens is not in the path of rays in the optical system to a measuring position wherein the examined lens is in the path of the rays. The lens meter includes an image sensor for detecting the position of the pattern image using four line sensors 10a, 10b, 10c and 10d disposed on a pattern image forming plane and arranged in a cross shape, and the pattern creating member forms a pattern image having a quadrangular shape on the pattern image forming plane so that each line sensor intersects a side of the quadrangle, thereby facilitating accurate measurement of desired optical properties.

16 Claims, 10 Drawing Sheets

CASE OF A SQUARE SHAPE
INTERSECTIONS OF SENSORS: A, B, C AND D
$$X = (B + D)/2$$
$$Y = (A + C)/2$$

CASE OF A SHAPE OF N
INTERSECTIONS OF SENSORS: a, b AND c
$$X = (a + c)/2$$
$$Y = [\, b - (a + c)/2 \,] \cdot \tan\theta \quad \text{(ANGLE OF INTERSECTION: } \theta)$$

EXPANDED DIAGRAM EXHIBITING A PATTERN IMAGE PROJECTED ON A CCD LINE SENSOR

THE SIGNAL OF THE PATTERN IMAGE IS BLURRED WHEN THE PATTERN IMAGE IS PROJECTED ON THE LINE SENSOR IN AN OBLIQUE DIRECTION. THIS EFFECT BECOMES MORE MARKED IN A DEFOCUSED CONDITION IN WHICH THE PATTERN IMAGE IS NOT FOCUSED ON THE LINE SENSOR.

AUTOMATIC LENS METER

FIELD OF THE INVENTION

The present invention relates to a lens meter for measuring optical properties of a spectacle lens or a contact lens.

BACKGROUND OF THE INVENTION

When optical properties of a lens are measured by a manual lens meter, the image focusing plane is obtained by crude visual observation or by enhanced observation using an apparatus. Relative positions of elements in the optical system, including the position of the examined lens along the optical axis and the distance between the examined lens and the optical system having a light source, are varied; and the focal length is obtained by determining the distance required to move the elements to find the image focusing plane and the distance measured between the examined lens and the optical system having the light source. However, obtaining the image focusing plane by crude or enhanced visual observation has a drawback in that an error in measurement tends to occur depending on the individual persons performing the measurement. This error may include random human errors and systematic measuring errors if the observer's vision includes a refractive error.

To overcome the above drawbacks inherent in the use of the manual lens meter, automatic lens meters have been proposed as described in Japanese Patent Application Laid-Open Nos. Showa 49(1974)-122355, Showa 60(1985)-17335 and Heisei 8(1996)-20334. An automatic lens meter described in Patent Application Laid-Open No. Showa 49(1974)-122355 comprises an examined lens positioned so that the optical center of the examined lens is placed on the optical axis of a collimator for sending light and a collimator for receiving light, an optical system for taking an image which has a photoelectric converter disposed on a focusing plane along the extension of the above optical axis, an electric circuit which arranges luminance signals of a target image decomposed by scanning lines of the photoelectric converter and calculates the position where the time width area of the electric luminance signal between one direction of movement and another direction of movement of the optical system having a light source is minimized, and a circuit automatically controlling the reciprocal movement of the optical system having a light source synchronously with the above electric circuit by a pulse motor and a signal generator for driving the pulse motor. The position where the image of the target has the smallest area, and is most focused, is converted into a signal expressed as the diopter.

In automatic lens meters, including the automatic lens meters described in Japanese Patent Application Laid-Open Nos. Showa 49(1974)-122355 and Showa 60(1985)-17335, it is necessary that a means for detecting the best position and a mechanism for moving the target be disposed. Therefore, an improvement is made when the refractive index, the angle of the axis and the prism values of the lens for examination can be measured by treatments of signals of an image sensor disposed on the focusing plane of an image-forming lens without the need to move a slit pattern. Such a simplified construction is disclosed as the automatic lens meter described in Japanese Patent Application Laid-Open No. Heisei 8(1 996)-20334.

In the automatic lens meter described in Japanese Patent Application Laid-Open No. Showa 60(1985)-17335, the incident light rays used for the measurement of optical properties are divided into two groups of component rays by the object lens that received the incident rays. The decentering distance of the rays measured or focused by the examined lens, being related to the prism value of the examined lens, is detected by two image sensors, and the refractive power is calculated from the data obtained by the two sensors. Since the measured rays, having passed through the lens being examined, are divided into two groups of refracted rays, being a group of rays refracted or polarized in the X-direction and a group of rays refracted or polarized in the Y-direction, sent to the image sensors, the amount of the light signal sent to each image sensor decreases to one half or less of the original intensity of the incident light signal. Therefore, a special electric treatment for increasing the S/N ratio is necessary but the electric circuits required to perform the amplification are complicated and expensive.

Moreover, because a beam splitter for dividing the rays and the two image sensors are required, it is inevitable that to construct the path of rays, the two image sensors and portions for disposing these components make the apparatus complicated and expensive to manufacture.

In the automatic lens meter described in Japanese Patent Application Laid-Open No. Heisei 8(1996)-20334, the decentering distances of the rays measured or focused by the examined lens in the X-direction and in the Y-direction are detected by a single image sensor placed at a position behind the object lens that receives the measured rays, and the refractive power of the examined lens is calculated from the data obtained by this single sensor. A slit pattern having an "N" shape is used when performing the measurement; therefore, a portion of the slit pattern is placed obliquely with respect to the image sensor to detect rays in the Y-direction and this causes a problem in that the accuracy of the information on the position decreases.

The present invention overcomes the above problems and has an object of providing an automatic lens meter having a simple structure and exhibiting a high accuracy of measurement.

BRIEF SUMMARY OF THE INVENTION

The present invention provides an automatic lens meter comprising an optical system in which a pattern image is formed by projection of a pattern created in a pattern creating member. Then, the optical properties of the lens being examined are measured based on the displacement of the pattern image from a base position wherein the path of the rays in the optical system does not include the examined lens to a measuring position wherein the path of the rays in the optical system includes the presence of the examined lens. The automatic lens meter comprises a plurality of light sources arranged at positions separated from an optical axis of the optical system by a same distance (also referred to as "equidistant") on a plane perpendicular to the optical axis, a light transfer lens which is disposed in a manner such that an optical axis thereof is the same as the optical axis of the optical system and arranges rays from the light sources into parallel rays, a measurement table on which the lens for examination is disposed in a path of rays from the light transfer lens, a collimator lens through which rays from the light transfer lens pass and form images of the plurality of light sources on the lens for examination disposed on the measurement table, a pattern creating member which is disposed between the light transfer lens and the collimator lens, an object lens for receiving rays which forms a pattern image of the pattern created by the pattern creating member on a specific pattern image forming plane, and line sensors arranged on the pattern image forming plane, wherein the pattern image is formed as a tetragonal shape on the pattern image forming plane from the pattern created in the pattern creating member, the line sensors are arranged so as to intersect four sides of the tetragonal shape of the pattern image on a same plane as the pattern image forming plane, and the information on displacement of the pattern image is obtained from information on positions of intersections of the line sensors and the four sides of the tetragonal shape of the pattern image.

Further objects, features and advantages the present invention will become apparent from the Detailed Description of Preferred Embodiments which follows when considered together with the attached Drawings.

DETAILED DESCRIPTION OF THE INVENTION

In accordance with the present invention, an automatic lens meter and preferred embodiments thereof will be described below with reference to the above Figures.

Figure 1:
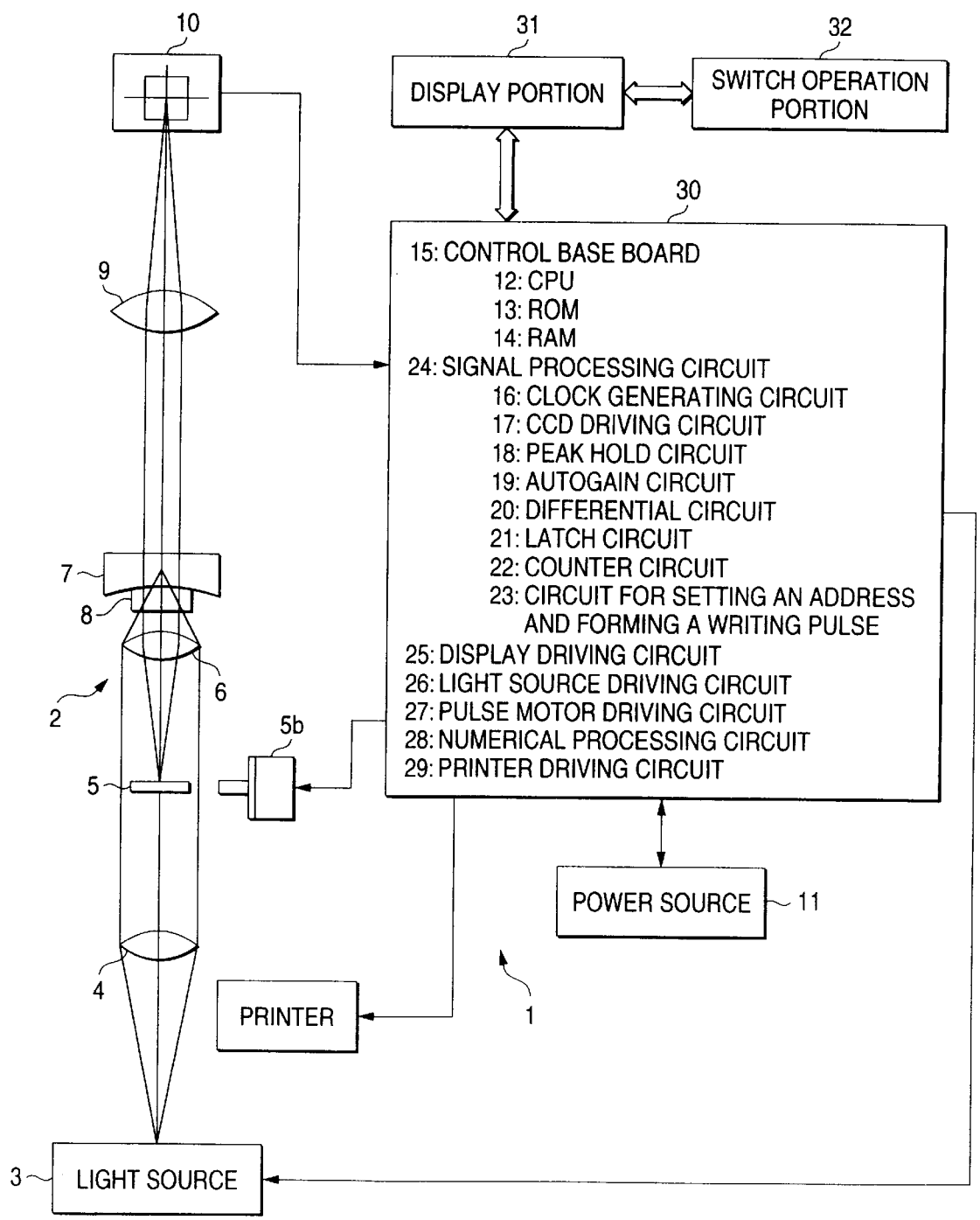
FIG. 1 shows a system block diagram of the lens meter as a first preferred embodiment of the present invention.
Figure 2:
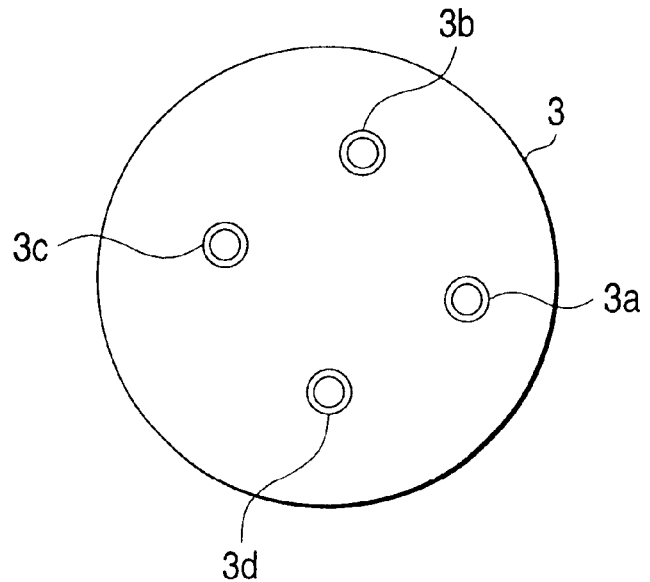
FIG. 2 shows a front view of the light sources.

Referring to FIG. 1, an optical system 2 is described first. Light sources 3 comprise four high luminance light emitting diodes (LED) 3a, 3b, 3c and 3d and are used as the light sources of lens meter 1. As shown in FIG. 2, it is necessary that the four LEDs be disposed at apices of a square having the center on the optical axis of the optical system and separated from each adjacent LED by the same distance so that the calculation described later is simplified. Light transfer lens 4 arranges the incident light rays emitted from each LED into parallel rays. In other words, the light source 3 is disposed at the focal point of the light transfer lens 4.

Figure 3:
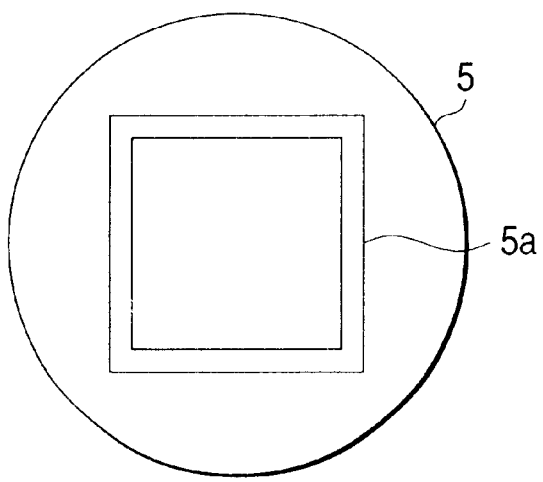
FIG. 3 shows a front view of a pattern creating member.

Pattern creating member 5 is disposed in the path of the parallel light rays and creates a slit pattern. As shown in FIG. 3, a square slit pattern 5a is formed on the pattern creating member 5. The pattern creating member can move between the light transfer lens 4 and a collimator lens 6. Collimator lens 6 plays two roles. First, lens 6 is used to create images of the light sources on the examined lens 7. In this context, the examined lens 7, which also may be referred to as the "lens being examined" or the "lens for examination," is the lens that will have optical properties measured by the optical system 2. Second, the other function of collimator lens 6 is to arrange bundles of rays that form the image of the slit pattern 5a into parallel rays in combination with the lens effect of examined lens 7.

A measurement table 8 is adjusted so that the lens for examination 7 is disposed on the same plane as the plane of the four images of the LEDs of the light source 3. An object lens 9 focuses the parallel rays arranged by and arriving from the collimator lens 6 and the lens for examination 7 to form a focused image of the slit pattern 5a on the image sensor 10. In other words, image sensor 10 is disposed at the focal position of the object lens 9, and image sensor 10 detects the position of the pattern image as described later.

Figure 4:
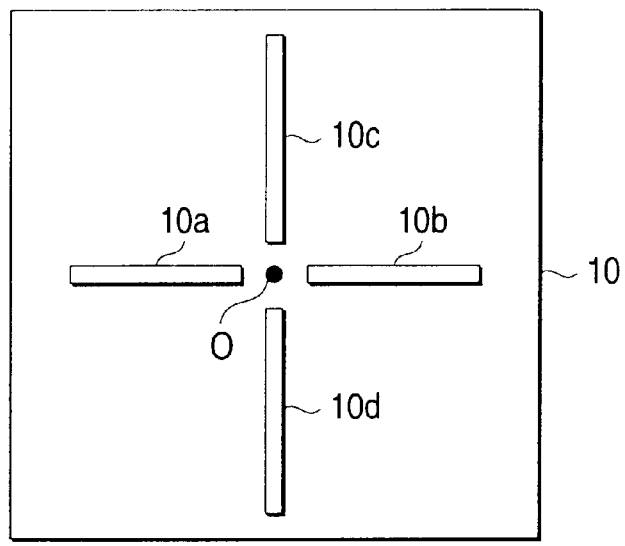
FIG. 4 shows a diagram exhibiting a construction of an image sensor.

FIG. 4 shows a diagram exhibiting the features of image sensor 10. As shown in FIG. 4, image sensor 10 has four line sensors (CCD) 10a, 10b, 10c and 10d arranged in the shape of an approximate "cross" on the pattern image forming plane of image sensor 10. Line sensors 10a, 10b, 10c and 10d are one-dimensional sensors for detecting a position. Each line sensor detects the position in the longitudinal direction at which the line sensor intersects the outline of the pattern image, which is formed on the pattern image forming plane of the image sensor. The detected position corresponds to the position of the outline of the pattern image. For example, when the pattern image is formed as a bright thick line on a dark background, there are two interfaces of the bright portion (corresponding to the illuminated portion of the sensor) and the dark portion (corresponding to the two non-illuminated portions of the sensor) at the intersection of the line sensor and the bright line of the pattern image outline. Therefore, the position of intersection between the outline of the pattern image and the line sensor can be determined with excellent accuracy by detecting the positions of the two interfaces and obtaining the midpoint between these two detected positions.

Figure 5:
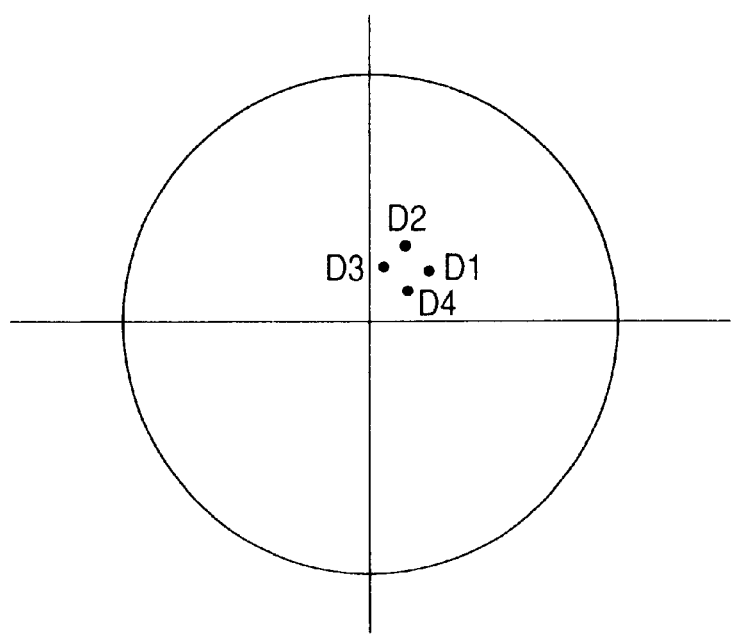
FIG. 5 shows a diagram exhibiting images of light sources formed on the lens being examined.

The incident rays emitted from the light sources comprising the four LEDs 3a, 3b, 3c and 3d (FIG. 2) pass through the light transfer lens 4, irradiate the slit pattern 5a, pass through the collimator lens 6, go through the lens for examination 7 and then reach the image sensor 10 via the object lens 9. These optical components are arranged so that the position of the light source and the position of the back surface of the examined lens 7 are optically conjugate. In other words, the incident rays from the four LEDs of the light source 3 are temporarily focused at the corresponding four positions on the back surface of the lens for examination 7, thereby forming images D1, D2, D3 and D4 on the examined lens (FIG. 5).

The slit pattern 5a (FIG. 3) is kept at an approximate conjugate position with respect to the position of the image sensor 10. In other words, the optical measurement of examined lens 7 is obtained when the conjugate relation between the slit pattern 5a and the image sensor 10 is maintained, which occurs by moving the pattern creating member 5 along the optical axis of the optical system 2 using a pulse motor 5b under servo-control in accordance with an equivalent spherical value of the lens for examination. In this context, "equivalent spherical value" is the dioptric power of the lens being examined. As would be appreciated by one skilled in the art, a lens has a spherical dioptric power S and a cylindrical dioptric power C corresponding to the spherical focus and the cylindrical focus respectively. In the case of a spherical lens, the equivalent spherical value is equal to (S+C)/2.

Figure 11:
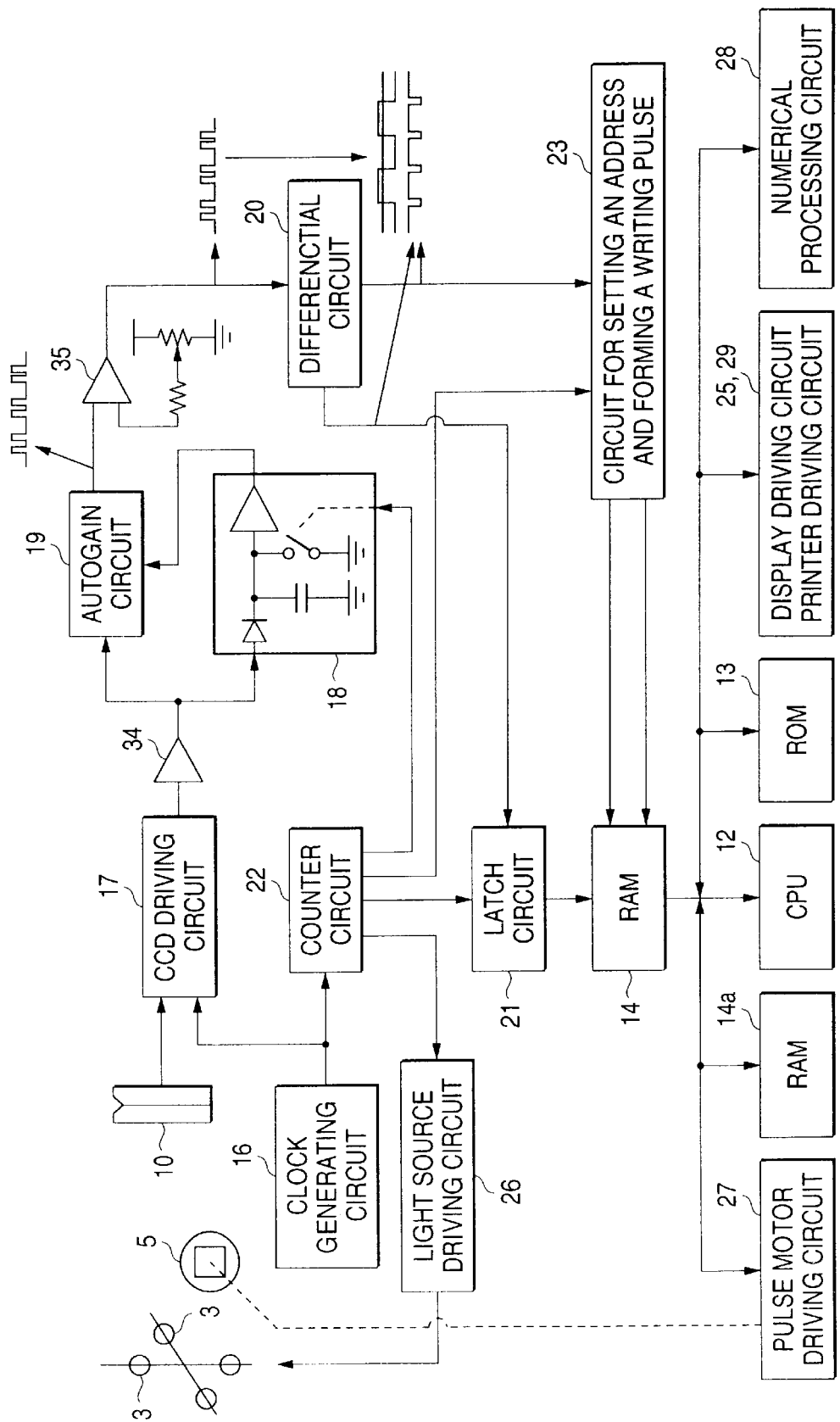
FIG. 11 shows an electric circuit of a lens meter as a second preferred embodiment of the present invention.

An electric processing system for performing control, detection and calculation functions, in combination with the above optical system schematically represented in FIGS. 1 and 11, comprises a power source 11 (i.e. an AC power input that is converted into a DC power input and supplied to a control portion 30); a control base board 15 comprising CPU 12, ROM 13 and RAM 14; a signal processing circuit 24 comprising a clock generating circuit 16, a CCD driving circuit 17, a peak hold circuit 18, an autogain circuit 19, a differential circuit 20, a latch circuit 21, a counter circuit 22 and a circuit for setting an address and forming a writing pulse 23; a control portion 30 comprising a display driving circuit 25, a light source (LED) driving circuit 26, a pulse motor driving circuit 27, a numerical processing circuit 28 and a printer driving circuit 29; a display portion 31 for an LED display or a monitor display; and an operation switch portion 32 which is exposed to the outside and used for operations (i.e. to activate the automatic lens meter). The electric system in the control portion 30 will be described below.

In accordance with the present invention, a method for calculating the optical properties of the examined lens, to include the spherical dioptric power S, the cylindrical dioptric power C, the direction of the cylinder axis (AX=θ) and the amount of decentering (i.e., being related to the overall prism value of the whole entire lens for examination), is based on the local prism amount (or local prism value) at each of the four optical points $(X_i, Y_i)$, i=1 to 4, located on the examined lens as will be described below. For the purpose of this disclosure, the phrase "prism value" and the phrase "prism amount" are considered to be equivalent phrases, and may be used interchangeably. Furthermore, the phrase "amount of decentering" describes the distance between the optical axis of the lens meter and the optical axis of the examined lens.

Figure 7:
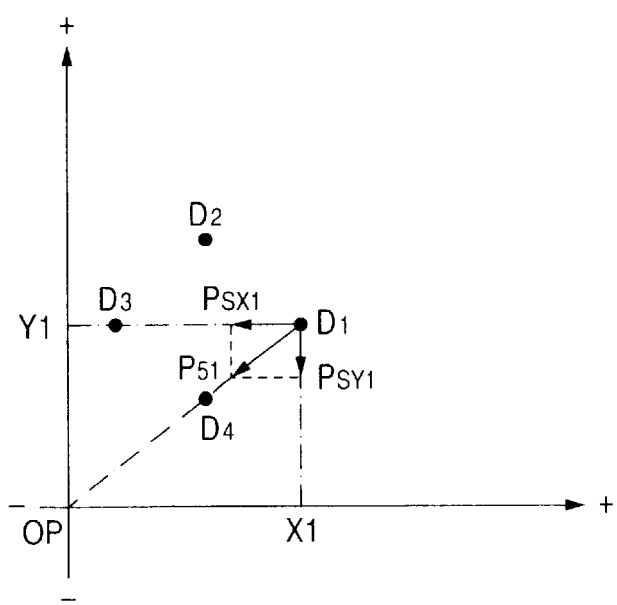
FIG. 7 shows a diagram exhibiting analysis of a prism formed by a spherical surface.

The prism amount, being the prism value wherein the incident light ray is redirected by the lens locally at each of the optical points D1 to D4, is treated by separating the prism amount into a contribution provided by the spherical surface of the examined lens and a contribution provided by the cylindrical surface of the examined lens at each of these separate optical points. As shown in FIG. 7, in accordance with the Prentice's equation (the prism amount=the dioptric power (D)×the amount of decentering (mm)/10), the prism formed by the spherical surface $PS_i(PSx_i, PSy_i)$ is expressed as:

[Formula 1:]

In the X-direction:

$$PSX_i = \frac{X_i}{10}S$$

In the Y-direction:

$$PSY_i = \frac{Y_i}{10}S$$

The above equations lead to the following equation:

[Formula 2:]

$$PS_i = \frac{\sqrt{X_i^2 + Y_i^2}}{10}S$$

Figure 8:
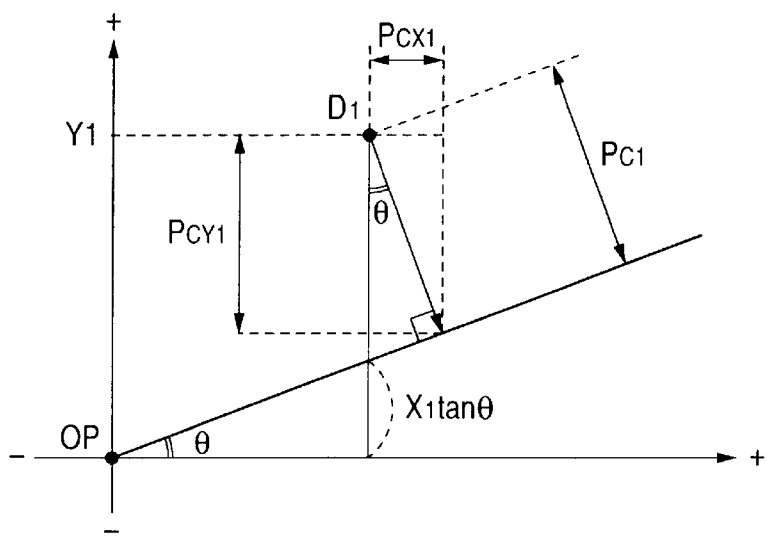
FIG. 8 shows a diagram exhibiting analysis of a prism formed by a cylindrical surface.

In the above equations, i=1 to 4 and $X_i$ and $Y_i$ represent the central coordinates of each point of the discrete pattern image. With reference to the diagram shown in FIG. 8, the prism formed by the cylindrical surface $Pc_i(PcX_i, PcY_i)$ is expressed as:

[Formula 3:]

$$Pc_i = \frac{(Y_i - X_i\tan\theta)\cos\theta}{10}C$$

[Formula 4:]

In the X-direction:

$$Pcx_i = \frac{(Y_i\cos\theta - X_i\sin\theta)}{10}C\sin\theta$$

[Formula 5:]

In the Y-direction:

$$Pcy_i = \frac{(Y_i\cos\theta - X_i\sin\theta)}{10}C\cos\theta$$

The resultant prism amount in the X-direction, being the sum of the spherical prism component and the cylindrical prism component in the X direction, is:

[Formula 6:]

$$PX_i = -\frac{X_i}{10}S + \frac{(Y_i\cos\theta - X_i\sin\theta)\sin\theta}{10}C$$

The resultant prism amount in the Y-direction, being the sum of the spherical prism component and the cylindrical prism component in the Y direction is:

[Formula 7:]

$$PY_i = -\frac{Y_i}{10}S + \frac{(X_i\cos\theta - Y_i\sin\theta)\cos\theta}{10}C$$

The resultant prism values in the X-direction and in the Y-direction are proportional to the displacement on the sensor. When the constant of proportion is represented by k and the prism amount is expressed as the displacement on the sensor, $PX_i = kx_i$ and $PY_i = ky_i$, wherein $x_i$ and $y_i$ represent the displacements on the sensor.

The resultant prism amount in the X-direction is:

[Formula 8:]

$$kx_i = -\frac{X_i}{10}S + \frac{(Y_i\cos\theta - X_i\sin\theta)\sin\theta}{10}C \quad (1)$$

The resultant prism amount in the Y-direction is:

[Formula 9:]

$$ky_i = -\frac{Y_i}{10}S + \frac{(X_i\cos\theta - Y_i\sin\theta)\cos\theta}{10}C \quad (2)$$

Equations for each point (i=1 to 4) can be obtained as follows.

From Equation (1):

[Formula 10:]

$$kx_1 = -\frac{X_1}{10}S + \frac{(Y_1\cos\theta - X_1\sin\theta)\sin\theta}{10}C$$
$$\ldots$$
$$\ldots$$
$$kx_4 = -\frac{X_4}{10}S + \frac{(Y_4\cos\theta - X_4\sin\theta)\sin\theta}{10}C$$

From Equation (2):

[Formula 11:]

$$ky_1 = -\frac{Y_1}{10}S + \frac{(X_1\sin\theta - Y_1\cos\theta)\cos\theta}{10}C$$
$$\ldots$$
$$\ldots$$
$$ky_4 = -\frac{Y_4}{10}S + \frac{(X_4\sin\theta - Y_4\cos\theta)\cos\theta}{10}C$$

The above equations can be converted as follows.
From Equation (1):

[Formula 12:]

$$k(x_1 - x_3) = \frac{(X_1 - X_3)}{10}S + \frac{\{(Y_1 - Y_3)\cos\theta - (X_1 - X_3)\sin\theta\}}{10}C\sin\theta \quad (3)$$

$$k(x_2 - x_4) = \frac{(X_2 - X_4)}{10}S + \frac{\{(Y_2 - Y_4)\cos\theta - (X_2 - X_4)\sin\theta\}}{10}C\sin\theta \quad (4)$$

From Equation (2):

[Formula 13:]

$$k(y_1 - y_3) = \frac{(Y_1 - Y_3)}{10}S + \frac{\{(X_1 - X_3)\sin\theta - (Y_1 - Y_3)\cos\theta\}}{10}C\cos\theta \quad (5)$$

$$k(y_2 - y_4) = \frac{(Y_2 - Y_4)}{10}S + \frac{\{(X_2 - X_4)\sin\theta - (Y_2 - Y_4)\cos\theta\}}{10}C\cos\theta \quad (6)$$

Figure 9:
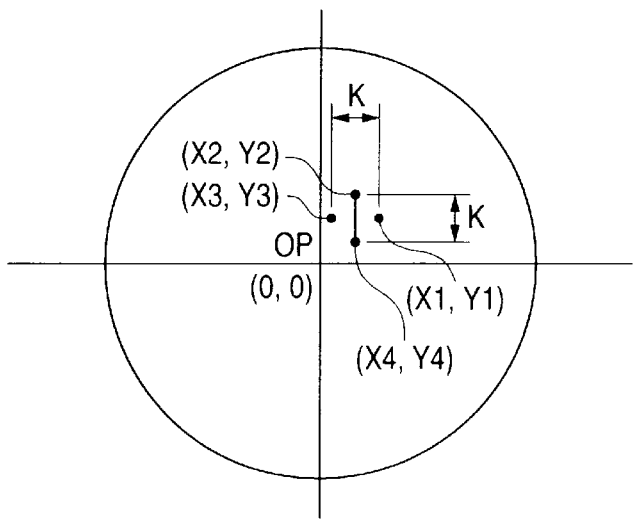
FIG. 9 shows a diagram exhibiting pitches of an image of a light source formed on the lens being examined.

The pitch distances of the images of the light sources on the lens being examined are defined as shown in FIG. 9.

When coordinates having OP (the optical center of the examined lens) at (0,0) is used, the following can be obtained:

$X_1 - X_3 = K$, $Y_1 - Y_3 = 0$, $X_2 - X_4 = 0$ and $Y_2 - Y_4 = K$.

Therefore, by utilizing the equations shown above, equations (3), (4), (5) and (6) can be simplified as follows:

[Formula 14:]

$$(3) \quad k(x_1 - x_3) = \frac{K}{10}S - \frac{KC\sin^2\theta}{10} \quad (7)$$

$$(4) \quad k(x_2 - x_4) = \frac{KC\sin^2\theta}{20} \quad (8)$$

$$(5) \quad k(y_1 - y_3) = \frac{KC\sin^2\theta}{20} \quad (9)$$

$$(6) \quad k(y_2 - y_4) = \frac{K}{10}S - \frac{KC\cos^2\theta}{10} \quad (10)$$

From Equations (7), (8), (9) and (10), Equations (11), (12) and (13) can be obtained as follows:

[Formula 15:]

$$S + \frac{C}{2} = -\frac{5k}{K}(x_1 - x_2 + y_2 - y_4) = \alpha \quad (11)$$

$$C\cos 2\theta = -\frac{10k}{K}(-x_1 + x_3 + y_2 - y_4) = \beta \quad (12)$$

$$C\sin 2\theta = -\frac{10k}{K}(-x_2 + x_4 - y_1 + y_3) = \gamma \quad (13)$$

From Equations (11), (12) and (13), the spherical dioptric power S, the cylindrical dioptric power C and the cylindrical axis Ax can be obtained as follows using Formula 16:

$$S = \alpha - \frac{\sqrt{\beta^2 + \gamma^2}}{2}$$

$$C = \sqrt{\beta^2 + \gamma^2} \quad (C: \text{positive})$$

$$Ax = \frac{1}{2}\tan^{-1}\frac{\gamma}{B} \quad (\beta > 0, \gamma > 0)$$

$$Ax = \frac{1}{2}\tan^{-1}\frac{\gamma}{B} + 90° \quad (\beta < 0)$$

$$Ax = \frac{1}{2}\tan^{-1}\frac{\gamma}{B} + 180° \quad (\beta > 0, \gamma \leq 0)$$

$$Ax = 45° \quad (\beta = 0, \gamma > 0)$$

$$Ax = 135° \quad (\beta = 0, \gamma > 0)$$

The prism value of the examined lens, being related to the amount of decentering in the lens layout of the examined lens, can be obtained as follows. When the x-component and the y-component of the prism value are represented by Px and Py, respectively, these components are given by:

[Formula 17:]

$$Px = \frac{k}{4}\sum_{i=1}^{4} xi = \frac{k}{4}(x_1 + x_2 + x_3 + x_4)$$

$$Py = \frac{k}{4}\sum_{i=1}^{4} yi = \frac{k}{4}(y_1 + y_2 + y_3 + y_4)$$

-continued $$P = \sqrt{Px^2 + Py^2}$$

[Formula 18:]

$$\sigma = \tan^{-1}\frac{-Py}{Px} \quad (Px > 0, Py \geq 0)$$

$$\sigma = \tan^{-1}\frac{Py}{Px} + 180° \quad (Px < 0)$$

$$\sigma = \tan^{-1}\frac{Py}{Px} + 360° \quad (Px > 0, Py < 0)$$

$$\sigma = 90° \quad (Px = 0, Py > 0)$$

$$\sigma = 270° \quad (Px = 0, Py < 0)$$

Therefore, the optical properties of the examined lens can be calculated from the four bundles of rays passing through the examined lens.

The method for obtaining the central coordinates ($X_i$, $Y_i$) of the pattern image, by using the image sensor 10 when four line sensors 10a, 10b, 10c and 10d are arranged in the shape of a cross with the center at the optical axis, will be described as follows below. As used previously, the four images of the light sources focused on the lens being examined are represented by D1, D2, D3 and D4.

Figure 6:
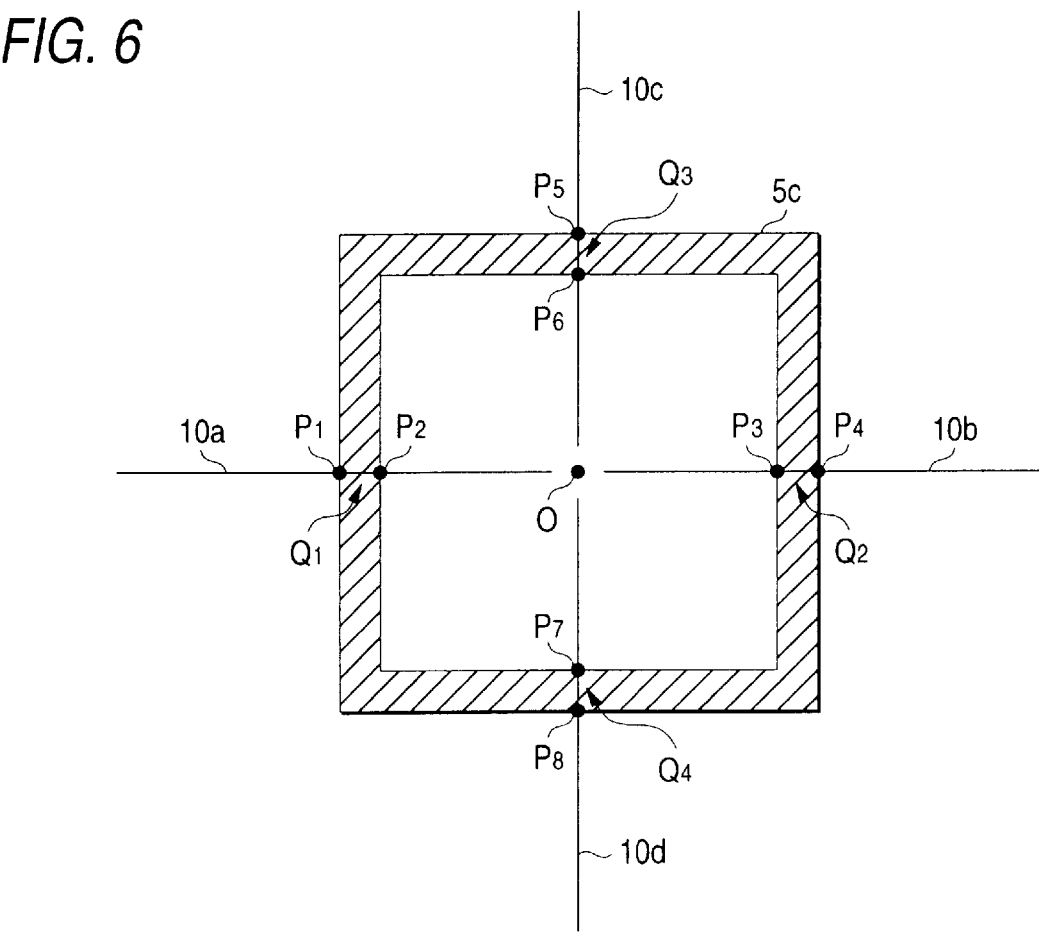
FIG. 6 shows a diagram describing detection of the position of a pattern image formed on a pattern image forming plane in the image sensor by line sensors.

FIG. 6 shows a pattern image having a quadrangular shape which is formed on the pattern image forming plane of the image sensor 10 when one LED is lighted. In FIG. 6, the pattern image having a quadrangular shape 5c is formed with thick bright lines on a dark background. The sides of the quadrangle of the pattern image each intersect the corresponding line sensors 10a, 10b, 10c and 10d at positions Q1, Q2, Q3 and Q4, respectively. The four line sensors 10a, 10b, 10c and 10d each detect the positions of two interfaces between the dark portion (non-illuminated portion of the sensor) and the bright portion (illuminated portion of the sensor) at the intersections Q1, Q2, Q3 and Q4, respectively. When the light source 3a (D1) is lighted, information on the eight interface positions P1 to P8 is determined as shown in FIG. 6. In a similar manner, when one of 10b (D2), 10c (D3) and 10d (D4) is lighted, information on eight interface positions corresponding to the respective lighted light source is obtained.

The X- and Y-coordinates of the center of a square pattern image 5c can be obtained by using the eight interface data positions obtained above as follows:

[Formula 19:]

$$x = \frac{Q_1 + Q_2}{2} = \frac{P_1 + P_2 + P_3 + P_4}{2}$$

$$y = \frac{Q_3 + Q_4}{2} = \frac{P_5 + P_6 + P_7 + P_8}{2}$$

In the above equations, x represents the position of the center of the square image in the horizontal direction expressed as the number of horizontal bits of the sensor and y represents the position of the center of the square image in the vertical direction expressed as the number of vertical bits of the sensor. The baseline position of the center of the square image can be expressed by the coordinates (X0, Y0) when there is no lens for examination in the path of the rays, and the measuring position of the center of the square image can be expressed by the coordinates (X1, Y1) when the lens for examination is present in the path of the rays. Subsequently, a new coordinate system can be formed by using points X1 and X0 to define the X-axis and points Y1 and Y2 to define the Y-axis. This new coordinate system is used to determine the prism amount of the examined lens as a whole as a direct measured property of the examined lens taking into account the amount of decentering.

On the other hand, equations (11), (12) and (13) and the equation of the prism amount as previously described above can be expressed as follows:

[Formula 20:]

$$S + \frac{C}{2} = \frac{5k}{K}\{(x_1 - x_{01}) - (x_3 - x_{03}) + (y_2 - y_{02}) - (y_4 - y_{04})\} = \alpha \quad (11')$$

$$C\cos 2\theta = \frac{10k}{K}\{-(x_1 - x_{01}) + (x_3 - x_{03}) + (y_2 - y_{02}) - (y_4 - y_{04})\} = \beta \quad (12')$$

$$C\sin 2\theta = \frac{10k}{K}\{-(x_2 - x_{02}) + (x_4 - x_{04}) + (y_1 - y_{01}) - (y_3 - y_{03})\} = \gamma \quad (13')$$

$$Px = \frac{k}{4}\{(x_1 - x_{01}) + (x_2 - x_{02}) + (x_3 - x_{03}) + (x_4 - x_{04})\}$$

$$Py = \frac{k}{4}\{(y_1 - y_{01}) + (y_2 - y_{02}) + (y_3 - y_{03}) + (y_4 - y_{04})\}$$

The spherical dioptric power S, the cylindrical dioptric power C and the cylindrical axis Ax can be determined from the equations for the spherical dioptric power S, the cylindrical dioptric power C and the cylindrical axis Ax described above by using the values of α, β and γ obtained from equations (11'), (12') and (13'). Thus, these other optical properties of the examined lens can be calculated from the intersection points between the four line sensors and the pattern image. In other words, the theory predicts that all of these optical properties of the examined lens can be directly measured or subsequently calculated by measurements obtained by the simple construction of the present invention (four line sensors, four light sources as separate points and a pattern). Moreover, in the present invention, the pattern is moved under servo-control as described above to create an enhanced prism effect.

The movement of the pattern will be described as follows below. There are two reasons for moving the pattern. One reason is related to the accuracy and the other reason is related to the effective length of the sensor and the prism amount. With respect to accuracy, it is known that the image of the light source focused on the lens being examined covers at least some area, and it is known that the pattern image on the lens for examination is blurred to some extent by the refractive effect of the examined lens when the dioptric power of the lens for examination increases. In other words, there is the possibility that the wave shape of the signal on the sensor is not sharp which makes it difficult to receive as a clear signal.

To overcome this drawback, the pattern is moved under a servo-control using a pulse motor and a correction is made on the spherical surface of the examined lens. The movement of the pattern is optically designed in advance so that the amount of the movement (the distance) and the refractive power (Dioptric power) has a prescribed regularity. Therefore, the relation between the amount of movement, the dioptric power, and the correction factor (or "correction") can be described by a specific equation since the amount of the movement of the pattern can be controlled by one pulse of the pulse motor. In actual practice, a specific amount of movement of the pattern is decided in advance based on the optical properties of the examined lens that were determined when the pattern was standing still so that the amount of movement of the pattern is predetermined.

Concerning the optical data obtained by detecting the pattern image after movement of the pattern, it is sufficient that the correction expressed by the number of D (Dioptric power) is known in advance by a relationship between the correction factor and the dioptric power of the examined lens. This relationship is obtained from previous measurements.

As described above, the movement of the pattern is used to decrease the blur of the pattern image on the sensor and is used to accurately obtain each of the eight interface position datum. Regarding the effective length of the sensor and the prism amount, in general, the lens meter is constructed with the characteristic that the measurement can be made in the range of ±25D (Dioptric power) and 5 prisms.

Figure 10:
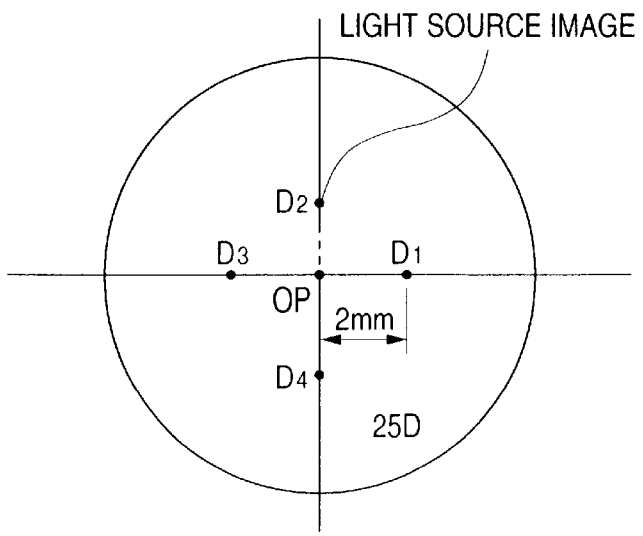
FIG. 10 shows a diagram exhibiting pitches of an image of a light source formed on the lens being examined.

In the present embodiment, as shown in FIG. 10, the prism amount at the point of measurement is 5 prisms when the pitch of the point of measurement is 4 mm, the amount of decentering from OP is 2 mm and the lens being examined is a spherical lens of 25D (Dioptric power). Given these parameters and the situation wherein the pattern is stationary, the maximum distance of the movement of the pattern image is 10 prisms and the sensor is required to have a length sufficient for the measurement at this distance. In other words, the maximum decentering distance for the stationary system with the above parameters is 10 prisms and the sensor must be constructed to be large enough to detect the image at this distance, which follows from the calculation for the maximum prism value shown below.

[Formula 21:]

$$P = \frac{HD}{10} = \frac{2 \times 25}{10} = 5 \text{ (prism)}$$
$$P_{MAX} = 5 + 5 = 10 \text{ (prism)}$$

When the pattern is moved by the distance of the spherical dioptric power, based upon the data detected before the movement of the pattern, the pattern images formed by the four light sources can be concentrated into a single image. The maximum distance of movement of the resultant image is 5 prisms and it is required that the sensor only be sufficiently sized to measure the image at this lesser distance. In other words, when the pattern is moved, the sensor can be made smaller and the optical system can be made more compact because there is less of a prism effect.

The pattern is moved to achieve the benefits described above. When the pattern is moved, the equation for determining the spherical dioptric power S is somewhat different from the equations described in the Formula 16. The equation used to describe the spherical dioptric power when the pattern is moved is as follows:

[Formula 22:]

$$S = \alpha - \frac{\sqrt{\beta^2 + \gamma^2}}{2} + SE$$

wherein SE represents the spherical dioptric power corresponding to the movement of the pattern, and is defined as follows:

SE=(the spherical dioptric power corresponding to one pulse of the pulse motor)×(the number of pulses sent to the pulse motor)

In FIG. 11, one preferred embodiment of the invention is schematically summarized and will be correspondingly elaborated in this section. Specifically, this preferred embodiment of the automatic lens meter of the present invention includes control portion 30 of the automatic lens meter, and what is described below includes the processing of signals in this electrical system. More specifically, an initial pulse signal originates from a clock generating circuit 16 of the signal processing circuit 24. This initial pulse signal is frequency-divided by a counter circuit 22 and an LED driving signal is formed. The LED driving signal is sent to the LED light sources 3 via an LED driving circuit 26 and the four LED light sources 3A, 3B, 3C, and 3D are lighted, each LED being successively lighted for 20 ms. For example, counter circuit 22 and CCD driving circuit 17 may be activated by a reference pulse (800 KHz) generated in the clock generating circuit 16, although the invention can be practiced using reference pulses at other frequencies. The lighting of the LED light sources 3 and activation of other sub-circuits of control portion 30 are synchronized by the control portion 30 and the four LED light sources 3, which generate light images D1 to D4, each LED repeats the timed series action (i.e., lighting for 20 ms and extinguishing for 60 ms) under control by the LED driving circuit 26.

The light rays originating from the four LED light sources 3 each irradiate the pattern and reach the line sensors in the image sensor 10. The rays reaching each line sensor in the image sensor 10 include four separate groups of rays carrying four separate signals which correspond respectively to a signal for D1, a signal for D2, a signal for D3 and a signal for D4 that occur in a timed series manner. An output signal from the line sensor of the image sensor 10 passes through the CCD driving circuit 17 and an amplifier 34, then reaches a peak hold circuit 18 and an autogain circuit 19. In the peak hold circuit 18, a dummy signal (for example, a light signal generated for 5 ms) is generated by lighting the 3A LED, and the dummy signal is output to the autogain circuit 19. When the amount of the light emitted from the 3A LED is small, the peak value is small and, when the amount of the light emitted from the 3A LED is great, the peak value is great.

The degree of amplification in the autogain circuit 19 is controlled based on the dummy signal input into the autogain circuit 19. When the amount of light emitted from the 3A LED is small, the degree of amplification is adjusted to a greater value; and, when the amount of light emitted by the 3A LED is great, the degree of amplification is adjusted to a smaller degree. Thus, the autogain output of the autogain circuit is input into a comparator 35 as a signal having a constant amplitude independent of the amount of light. The comparator output of the comparator 35 is input into a differential circuit 20. The differential circuit 20 outputs a pulse (also referred to as the "differential pulse") that is formed every time the change in the amount of light exceeds a prescribed value. The differential pulse from the differential circuit 20 is input into a circuit 23 for setting an address and forming a writing pulse. An address is formed from the differential pulse in combination with the value of, being a signal from, the counter circuit 22. The writing pulse formed from the processing of the differential pulse by circuit 23 is input into RAM 14.

The position on the line sensors 10a, 10b, 10c, and 10d, irradiated by light rays is latched by the pulse input inputted into latch circuit 21 by differential circuit 20 and output sent to RAM 14 from the latch circuit 21. In this manner as described above, the interface positions on the image sensor 10 that are irradiated by rays when light sources 3A to 3D are lighted can be regularly and reliably memorized in RAM 14.

Whenever necessary, CPU 12 reads the content of RAM 14 and S, C and Ax can be calculated by suitable calculation using the interface position data collected. In addition, the CPU 12 can read the contents of RAM 14 and determine data for driving the pulse motor 5b to a suitable position for measuring the light rays.

The array of data written into RAM 14 is read out by CPU 12, ROM 13 and RAM 14a when necessary and the various optical properties and dimensions of a spectacle lens is calculated by a numerical processing circuit 28. The results of the calculation are displayed on a CRT display via a driving circuit 25, where desired, or printed by a printer via a printer driving circuit 29.

In accordance with one preferred embodiment of the present invention as described above, a rectangular pattern is used with four line sensors arranged in a shape of a cross. The pattern is positioned so that the vertical portion of the pattern is detected by the line sensors disposed in the horizontal direction and the horizontal portion of the pattern is detected by the line sensors disposed in the vertical direction. This geometry facilitates the calculation, and remarkably improves the accuracy of detection of the interface data positions.

Figure 12:
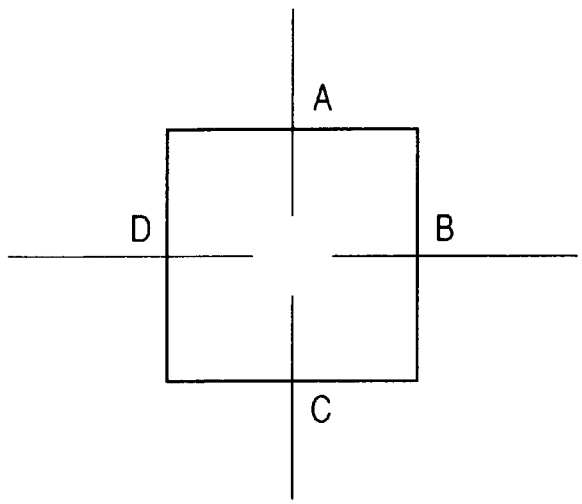
FIG. 12 shows a diagram exhibiting one advantage of the preferred embodiment of the invention with a square slit pattern.
Figure 13:
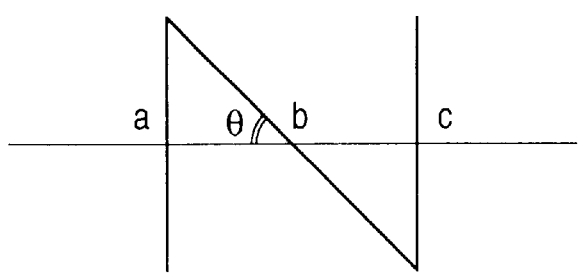
FIG. 13 shows a diagram exhibiting the disadvantage of the N-shaped slit pattern compared to a preferred embodiment of the invention.

For example, as shown by the equations for determining the center of the pattern from the coordinates of the intersections of the line sensors and the pattern corresponding to the geometry illustrated in FIGS. 12 and 13, the calculation can be simplified by the use of the square pattern described above in comparison with the conventional use of a pattern having the shape of an "N."

Figure 14:
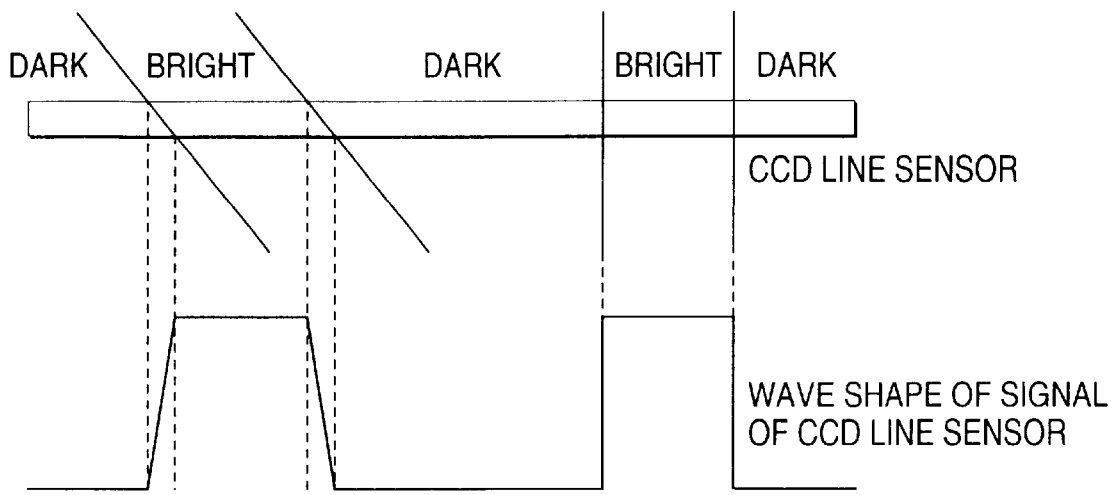
FIG. 14 shows a diagram exhibiting a second advantage of the preferred embodiment of the invention.

As shown in FIG. 14, for improving the accuracy of detection of the position of intersection of the line sensor and the pattern, the intersection at the right angle shown by the square pattern of the above embodiment is more advantageous in comparison with the oblique intersection in the conventional case of the pattern having the shape of an "N."

Figure 15:
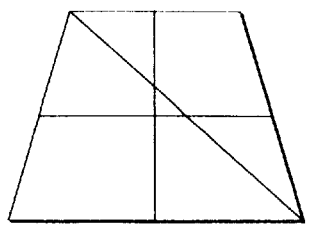
FIG. 15 shows a diagram exhibiting a disadvantage of an N-shaped slit pattern when the image is distorted.
Figure 16:
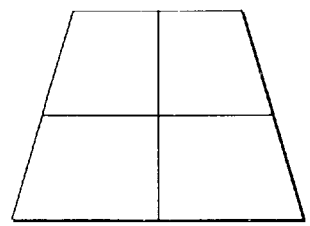
FIG. 16 shows a diagram exhibiting an advantage of the square slit pattern in accordance with the preferred embodiment of the invention when the image is distorted.

Moreover, one skilled in the art would appreciate that any optical system, such as the optical system for projecting a pattern in accordance with the present invention, always has some degree of optical aberration. In general, the degree of aberration increases as the distance from the optical center increases. For example, cases in which an image of a square pattern is distorted to appear as a trapezoid as shown in FIGS. 15 and 16 may be considered. When a pattern having a shape of N is used, as shown in FIG. 15, a greater degree of error arises in the Y-coordinate. In contrast, when a square pattern, such as the pattern in the above preferred embodiment of the invention, is used as shown in FIG. 16, the error can be made very small.

Figure 17:
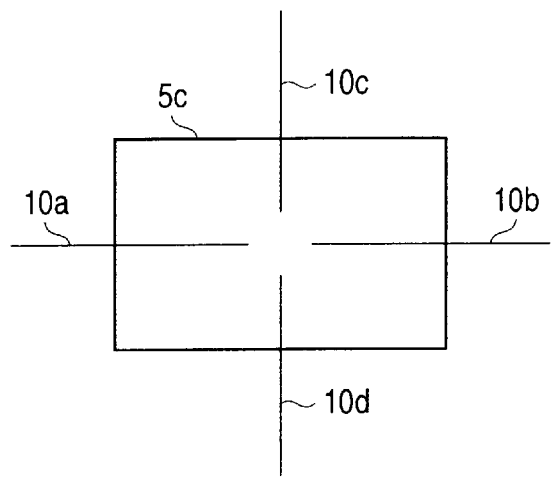
FIG. 17 shows a diagram exhibiting the structural relationship between the pattern image and line sensor arrangement of a preferred embodiment of the present invention.
Figure 18:
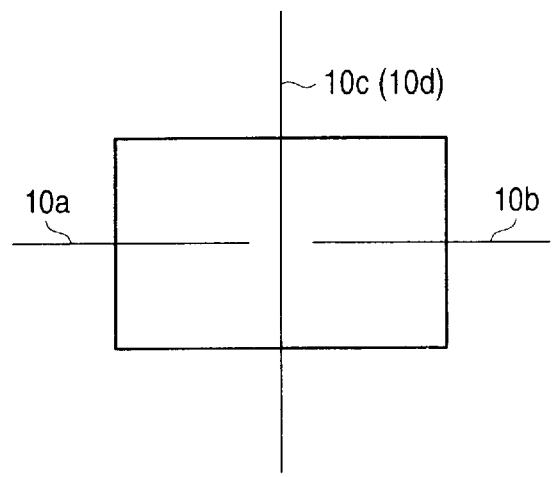
FIG. 18 shows a diagram exhibiting the structural relationship between the pattern image and line sensor arrangement of a third preferred embodiment of the present invention.
Figure 19:
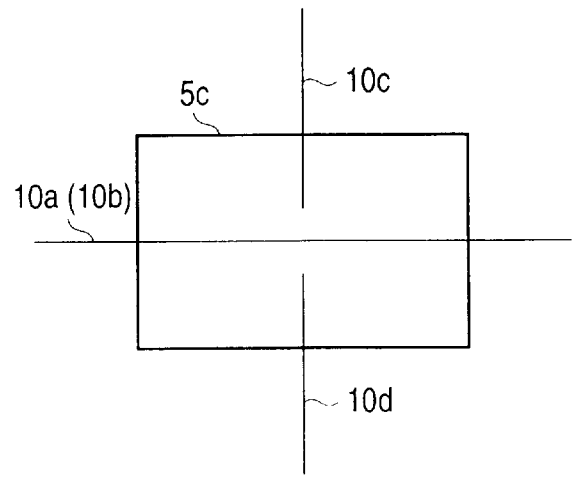
FIG. 19 shows a diagram exhibiting the structural relationship between the pattern image and line sensor arrangement of a fourth preferred embodiment of the present invention.

In the above preferred embodiment, the pattern formed in the pattern creating member 5 has a shape of a square and the four line sensors 10a, 10b, 10c, and 10d are arranged in the shape of a cross. The pattern may have a rectangular shape as shown in FIG. 17. Alternately, the line sensors may be arranged in a manner such that two opposing line sensors disposed on either the vertical line or the horizontal line portions forming the shape of a cross are connected to each other to form a single line sensor 10c(10d) or 10a(10b) as shown in FIGS. 18 and 19, respectively.

Figure 20:
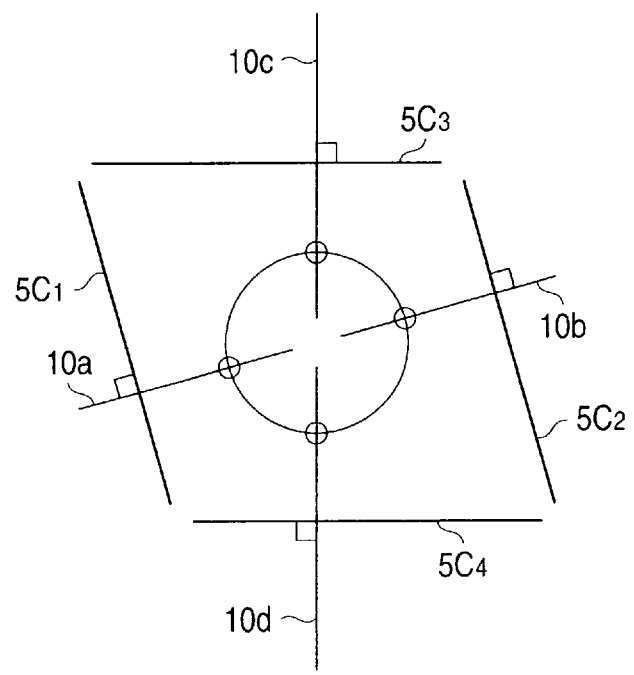
FIG. 20 shows a diagram exhibiting the line sensor arrangement in accordance with a fifth preferred embodiment of the present invention.
Figure 21:
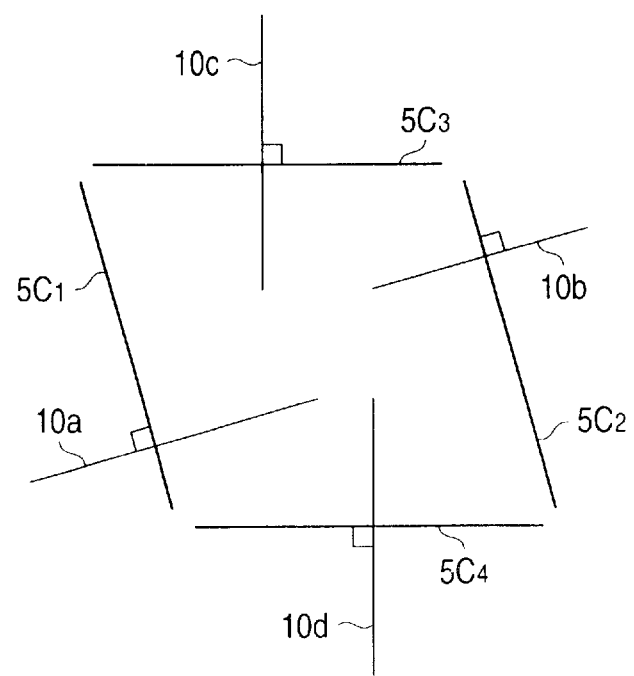
FIG. 21 shows a diagram exhibiting the line sensor arrangement in accordance with a sixth preferred embodiment of the present invention.

In an alternate embodiment as shown in FIG. 20, the pattern may take the shape of a parallelogram rather than the shape of a rectangle. Furthermore, it is not necessary that the four sides of the parallelogram be continuously connected to each other. In other words, sides adjacent to each other may be separate from one another. Each pair of line sensors 10a, 10b and 10c, 10d respectively may be disposed on each of two lines 5C1, 5C2 and 5C3, 5C4 thereby forming a cross with axis which intersect each other at a desired angle which is not the right angle (e.g., 90 degrees, orthogonal). In this case, it is desirable that each side of the pattern 5C1, 5C2, 5C3, 5C4 and the line sensor 10a, 10b, 10c, 10d intersecting this respective side intersect each other at the right angle. As shown in FIG. 21, it is not always necessary that the two line sensors 10c and 10d in the vertical direction or the two line sensors 10a and 10b in the horizontal direction are disposed on the same line.

As described above in detail, the present invention provides an automatic lens meter comprising an optical system in which a pattern image is formed by projection of a pattern created in a pattern creating member followed by measuring optical properties of a lens for examination based on information regarding the displacement of the pattern image from a base position (i.e. without the examined lens being in the path of the rays of the optical system) to a measuring position (i.e. wherein the examined lens is positioned in the path of rays). The pattern creating member 5 is constructed so that a pattern image of a pattern that has a quadrangular shape is formed on the pattern image forming plane. Corresponding line sensors are arranged so as to intersect the four sides of the pattern having a quadrangular shape on the same plane as the pattern image forming plane. Information directed to the displacement of the pattern image with respect to the base position is obtained from the information corresponding to the positions of the intersections between the line sensors and the four sides of the image of the pattern having a quadrangular shape. The automatic lens meter thus constructed in accordance with the present invention has a simple structure and provides excellent accuracy.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. An automatic lens meter comprising an optical system that produces a pattern image by projecting of a pattern created by a pattern creating member, wherein optical properties of a lens being examined by the optical system are determined based upon displacement of the pattern image from a baseline position to a measuring position, wherein the baseline position is determined in the absence of a lens being examined in the optical system and the measuring position is determined in the presence of the lens being examined in the path of rays in the optical system, the automatic lens meter comprising:

a plurality of light sources arranged at positions equidistantly separated from an optical axis of the optical system on a plane perpendicular to the optical axis;

a light transfer lens disposed so that an optical axis thereof is aligned with the optical axis of the optical system to arrange light rays originating from the light sources into parallel rays;

a measurement table on which the lens being examined is disposed in the path of the rays from the light transfer lens;

a collimator lens through which rays from the light transfer lens pass and form images corresponding to the plurality of light sources on the lens being examined, wherein a pattern creating member is disposed between the light transfer lens and the collimator lens;

an object lens disposed to receive rays and form the pattern image of the pattern created by the pattern creating member on a specific pattern image forming plane; and line sensors arranged on the pattern image forming plane, wherein the pattern image formed has a tetragonal shape on the pattern image forming plane, and the line sensors are arranged so as to intersect four sides of the tetragonal pattern image on the same plane as the pattern image forming plane, wherein the pattern image displacement information is determined from information on intersection positions between the line sensors and the four sides of the tetragonal pattern image.

2. An automatic lens meter according to claim 1, wherein the plurality of light sources comprises four light emitting elements disposed at apices of a square.

3. An automatic lens meter according to claim 2, wherein the line sensors are arranged in a shape of a cross having a center at the optical axis on the pattern image forming plane.

4. An automatic lens meter according to claim 3, wherein the pattern creating member creates a pattern having a shape of a square or a rectangle.

5. An automatic lens meter according to claim 4, wherein the pattern creating member, disposed between the light transfer lens and the collimator lens, can move in a direction of the optical axis.

6. An automatic lens meter according to claim 3, wherein the pattern creating member, disposed between the light transfer lens and the collimator lens, can move in a direction of the optical axis.

7. An automatic lens meter according to claim 2, wherein the pattern creating member creates a pattern having a shape of a square or a rectangle.

8. An automatic lens meter according to claim 7, wherein the pattern creating member, disposed between the light transfer lens and the collimator lens, can move in a direction of the optical axis.

9. An automatic lens meter according to claim 2, wherein the pattern creating member, disposed between the light transfer lens and the collimator lens, can move in a direction of the optical axis.

10. An automatic lens meter according to claim 1, wherein the line sensors are arranged in a shape of a cross having a center at the optical axis on the pattern image forming plane.

11. An automatic lens meter according to claim 10, wherein the pattern creating member creates a pattern having a shape of a square or a rectangle.

12. An automatic lens meter according to claim 11, wherein the pattern creating member, disposed between the light transfer lens and the collimator lens, can move in a direction of the optical axis.

13. An automatic lens meter according to claims 10, wherein the pattern creating member, disposed between the light transfer lens and the collimator lens, can move in a direction of the optical axis.

14. An automatic lens meter according to claim 1, wherein the pattern creating member creates a pattern having a shape of a square or a rectangle.

15. An automatic lens meter according to claim 14, wherein the pattern creating member, disposed between the light transfer lens and the collimator lens, can move in a direction of the optical axis.

16. An automatic lens meter according to claim 1, wherein the pattern creating member, disposed between the light transfer lens and the collimator lens, can move in a direction of the optical axis.

* * * * *